United States Patent [19]

Haring

[11] Patent Number: 4,820,541
[45] Date of Patent: Apr. 11, 1989

[54] SPREAD CONTAINING DAIRY FAT

[75] Inventor: Petrus G. Haring, Vlaardingen, Netherlands

[73] Assignee: Lever Brothers Company, New York, N.Y.

[21] Appl. No.: 39,188

[22] Filed: Apr. 16, 1987

[51] Int. Cl.$^4$ ............................................. A23C 13/14
[52] U.S. Cl. ................................... 426/586; 426/602; 426/603; 426/604; 426/613
[58] Field of Search ............... 426/602, 603, 604, 586, 426/613

[56] References Cited

U.S. PATENT DOCUMENTS

| | | | |
|---|---|---|---|
| 1,591,714 | 7/1926 | Low et al. | 426/601 |
| 3,729,325 | 4/1963 | Howard | 426/602 |
| 4,447,463 | 5/1984 | Antenove | 426/603 |
| 4,515,825 | 5/1985 | Moran et al. | 426/603 |
| 4,536,411 | 8/1985 | Kirton | 426/603 |
| 4,606,926 | 8/1986 | Wiles | 426/603 |

FOREIGN PATENT DOCUMENTS

| | | |
|---|---|---|
| 76548 | 4/1983 | European Pat. Off. |
| 173401 | 3/1986 | European Pat. Off. |
| 2168283 | 8/1973 | France |
| 1273263 | 5/1972 | United Kingdom |
| 1450269 | 9/1976 | United Kingdom |

OTHER PUBLICATIONS

"Chemistry and Industry", Oils and Fats Group, Dec. 8, 1962, pp. 2054-2055.

"Food Processing and Marketing", The Butter, (Feb. 1965), pp. 51-54.

R. Ellis et al., "Lactones in Butter, Butteroil, and Margarine", Journal of the American Oil Chemists' Society, 52, (1975), pp. 252-255.

C. Andres, "Butter Flavor Variations Meet Specific Usage Demands", Food Processing (1981), pp. 62-63.

*Primary Examiner*—Jeanette Hunter
*Attorney, Agent, or Firm*—Milton L. Honig; Matthew J. McDonald

[57] ABSTRACT

A spread with a butter-like taste which contains a heat-treated dairy cream containing at least 30% (w/w) of fat and wherein at least 50% (w/w) of the whey proteins have been heat denatured. The spread may also contain water and/or non-dairy fat.

15 Claims, No Drawings

SPREAD CONTAINING DAIRY FAT

The invention relates to a spread containing a dairy emulsion and optionally non-dairy fat with an improved butter-like taste and flavour.

Such spreads are already known in the art, e.g. from GB-A-No. 1 273 263 (Unilever Ltd), and are prepared by super-cooking milk and incorporating such a super-cooked milk in the aqueous phase of a margarine. Milk normally contains up to about 4% dairy fat.

It is also known from EP-A-No. 0 173 401 (Unilever N.V. and PLC) to prepare a butter-like concentrated by mildly heating a mixture comprising 25-85% w/w butterfat, 5-37% w/w protein, 5-37% w/w carbohydrate and 0-20% w/w of conventional adjuvants (such as e.g. water, electrolytes, etc.). This butter concentrate can subsequently be worked into bakery margarines etc. employing amounts of 0.5-100 parts concentrate per thousand parts of margarine.

Surprisingly, it has now been found that spreads, such as margarine, with an improved buttery taste and flavour at a relatively low butter content are obtained if a heat-treated dairy emulsion is incorporated therein.

By a spread is meant an edible plastified dispersion of oil-in-water, water-in-oil or solid fat-in-liquid oil. Preferably, the spread is a water-in-oil dispersion.

Accordingly, the present invention provides a spread having a diary fat content btween 9 and 65% (w/w) comprising a heat-treated diary cream containing a substantial amount of denatured whey (or serum) protein. The amount of denatured whey proteins in the heat-treated dairy cream is at least 50% (w/w), preferably at least 70% (w/w) calculated on the total whey protein content. Denaturation is an effect observed when dairy emulsions are heated for a long time at high temperatures and is an unwanted phenomenon in normal practice as it causes milk proteins to settle out and, moreover, because by the time denaturation occurs, the flavour, colour and other properties of the dairy product will be adversely affected, for example by $H_2S$-formation and browning. For that reason in, for example, dairy industry pasteurization and sterilization temperatures are combined with heating times in such a manner that no significant denaturation is observed.

The present invention also provides a spread having a dairy fat content between 9 and 65% (w/w) comprising a dairy cream which has been heated to a temperature of at least 70° C. for at least 20 minutes. As incorporation of heat-treated dairy cream in spreads comprising more than 65% (w/w) dairy fat is considered to be superfluous, such spreads are not covered by the present application. For optimal results the shorter heating times are combined with temperatures in the upper part of the indicated range.

Preferably, the dairy cream comprises at least 30% (w/w) dairy fat. Examples of dairy cream are: cream, reconstituted cream or dairy butter. The best results are obtained if the cream comprises at least 3% (w/w) water.

In a preferred embodiment, the spreads according to the present invention have an overall water-plus non-dairy fat content ranging from 25-90, preferably from 50-86% (w/w). In a particularly preferred embodiment the spread contains: 9-50% (w/w) dairy fat, 0-41% (w/w) non-dairy fat and 50-86% (w/w) water. In yet another especially preferred embodiment the spread contains 9-60% (w/w) dairy fat, 20-86% (w/w) non-dairy fat and 5-50% (w/w) water. In the above preferred embodiments, the heated dairy cream is used to give the spread the flavour and taste of butter. Considering the percentage of dairy fat in such a spread, a remarkably good butter flavour is obtainable for such spreads. It is to be understood that part of the dairy fat content of the spread may not be derived from the heat-treated cream but, for example, from normal cream, butter, butterfat etc.

The non-dairy fat used is vegetable or animal oil or fat, optionally partially hydrogenated, mixtures thereof and fractions thereof. Polyunsaturated oils such as e.g soyabean oil, sunflower oil etc. are preferred. Instead of, or together with the above fats and/or oils, also fat substitutes such as esters of fatty acids and sugars may be used in spreads according to the present invention. The non-dairy fat may be subjected to the same heat treatment as the dairy fat, but preferably this is not done as it may adversely affect the butter flavour and taste.

Besides dairy fat, non-dairy fat and water, the spreads according to the present invention may also comprise adjuvants such as, for example, salt, emulsifiers, colouring agents, flavour compounds etc. Normally, these adjuvants will be present in amounts not exceeding 10% (w/w) of the spread.

In order to balance the taste and flavour of the spread, it has been found advantageous to reinforce the fresh-dairy note by incorporating a flavour block obtained by microbiological ripening of milk products, such as e.g. butter starter distillate. The amount added usually ranges between 5 and 100 ppm. Especially in case a substantial amount of non-dairy fat is applied, it is advantageous to incorporate additional butter flavour compounds in the spread to round off the butter flavour. Examples of such flavour compounds are: 4-cis-heptenal, diacetyl, delta-$C_{10}$-$C_{12}$ lactones etc. The additional flavour compounds are preferably added to the oil phase before it is worked into the product.

For dietary reasons it is often desirable that the non-dairy fat of the spread comprises a triglyceride of which at least 50% of the fatty acid groups are polyunsaturated.

The invention also provides a process for preparing a spread as defined above, which comprises heating a dairy cream to a temperature of at least 70° C. for at least 20 minutes, which heated dairy cream is subsequently worked, optionally together with other constituents, into a spread, so that a spread is obtained containing from 9-65% (w/w) dairy fat.

If the heat treatment is carried out under atmospheric pressure, the temperature is kept below 105° C. Preferably, heating temperatures between 80° and 95° C. are applied. When the dairy cream is heated for a period of time shorter than about 30 minutes, it is difficult to obtain reproducible results. The best results were obtained when the dairy cream was heated for 45-150 minutes. The heating preferably takes place in a closed system, i.e. a system from which the volatile flavour compounds cannot escape, such as a reflux system or a closed container. Heating causes certain flavour precursors to be converted into actual flavour compounds, such as methyl ketones, lactones, dimethyl sulphide and certain products of Maillard-type reactions. Although it is possible to work the heat-treated dairy cream into a spread, it is preferred to add thereto, before working it into a spread, water and/or non-dairy fat and/or non-heat-treated dairy emulsion. The extra components are preferably added in such amounts that the mixture to be worked into the spread contains 10-86% (w/w) non-dairy fat.

By dairy emulsion is meant a dairy product comprising dairy fat such as cream, reconstituted cream, butter, butterfat, whole milk, skim milk etc.

In a more preferred embodiment, the extra components are added in such amounts that the mixture to be worked into a spread comprises: 38-86% (w/w) non-dairy fat, 9-50% (w/w) of the heat-treated dairy cream, 5-50% (w/w) water and 0-50% (w/w) of a non-heat-treated dairy emulsion. In the most preferred embodiment the mixture comprises: 38-72% (w/w) non-dairy fat, 12-50% (w/w) of the heat-treated dairy emulsion, 6-40% (w/w) water and 10-44% (w/w) non-heat-treated dairy emulsion.

Another aspect of the present invention includes spreads obtainable by any of the processes described above. Such spreads may have an excellent butter flavour although they may well contain less dairy emulsion than is usually present in such blend products.

Yet another aspect of the invention is the use of a heat-treated diary cream containing a substantial amount of denatured protein, or a dairy cream which has been heated to a temperature of at least 70° C. for at least 20 minutes, for flavouring spreads comprising 9-65% (w/w) dairy fat.

The present invention provides a spread containing a dairy emulsion with more than 30% fat, non-dairy fat and an aqueous phase. At least part of the dairy emulsion has been heated to a temperature ranging from 70°-105° C. for at least 20 minutes. For optimal results the shorter heating times are combined with temperatures in the upper part of the indicated range. The dairy emulsion containing at least 30% fat is e.g. cream, reconstituted cream or dairy butter.

In a preferred embodiment the spread contains:
38-86% (ww) of non-dairy fat
9-50% (ww) of dairy emulsion which has been heated to a temperature of 70°-105° C. for at least 20 minutes
5-50% (ww) of an aqueous phase
0-50% (ww) of dairy emulsion which has not been subjected to the above heat treatment.

In a more preferred embodiment of the invention the spread contains:
38-72% (ww) of non-dairy fat
12-50% (ww) of heated dairy emulsion
6-40% (ww) of an aqueous phase
10-44% (ww) of non-heated dairy emulsion.

As to the heat treatment of the dairy emulsion, this preferably comprises subjecting the dairy emulsion to a temperature of 80°-105° C. for a period of time between 20 minutes and 3 hours under reflux conditions.

The invention is illustrated by the following Examples.

EXAMPLE 1

Molten butter (ex Nederlandse Melk Unie) was heated in a vessel with a lid, a stirring device and jacketed so that the temperature of the vessel was kept at a constant temperature.

After being kept for 2 hours at 80° C., the heat-treated butter was cooled by adding it in a pre-mix tank to the other constituents of the final product.

The composition prepared consisted of:
25 kg of the butter treated in this way
25 kg of non-heated dairy butter
40 kg partially hydrogenated soyabean oil and
10 kg water.

This mixture was fed into a scraped drum cooling device (Votator ®) and an edible fat spread was obtained.

The taste of the blend was creamy, buttery with a sweet aftertaste. When compared with a product of the same composition but with unheated butter (instead of the heated butter), the former was clearly preferred as the one with the most butter-like taste. When the products were assessed by trained panelists and they were asked the question whether the product tasted like butter or not, 60% of the panelists judged the product containing heated butter to taste like butter, while 40% of them judged the product without heated butter to taste like butter.

EXAMPLE 2

Molten butter was heated in a vessel with a reflux-condenser, so that no water or volatiles could excape from the mixture. After being kepr for 1 hour at 90° C., the heat-treated butter was cooled by adding it in a pre-mix tank to the other constituents of the final product.

2 kg of butter treated in this way was mixed with 1.2 kg of an aqueous phase containing 50 g of water-soluble ingredients (salt, citric acid, potassium sorbate) and butter starter distillate and processed with 4.8 kg of a fat blend consisting of sunflower oil (partially hydrogenated).

This mixture was fed into a scraped drum cooling device such as used in the margarine industry (Votator ®) and a margarine-type fat spread was obtained.

The taste of the spread was fresh-creamy with a sweet butter-like aftertaste. In a paired comparison test with a product of the same composition, but with unheated butter instead of heated butter, the product containing heated butter was preferred by the majority of the test panel.

EXAMPLE 3

Molten butter was heated in a round-bottomed flask with a reflux-condenser in an oil bath at 105° C. The round-bottomed flask was kept at this temperature for 30 minutes and was subsequently cooled to 40° C. by immersing the flask in ice water.

300 g of sweet butter (ex Buisman, Leeuwarden, Netherlands) treated in this way was mixed with 2.7 kg of a margarine with 84% fat consisting of a mixture of soyabean oil and 16% aqueous phase containing citric acid and potassium sorbate.

3 kg of a blended spread was obtained after feeding the mixture into a scraped drum cooling device such as used in the margarine industry.

The taste of the product obtained was clearly better than the same product containing 10% (ww) untreated dairy butter.

EXAMPLE 4

Molten butter was heated in a round-bottomed flask with a reflux-condenser in an oil bath at 90° C. The round-bottomed flask was kept at this temperature for 1 hour and was subsequently cooled to 40° C. by immersing the flask in ice water.

250 g of butter treated in this way was mixed with 600 g of a fat blend consisting of 70% sunflower oil and 30% of an interesterified mixture of hydrogenated sunflower oil and palm oil (9:1 weight ratio) and 1350 g of an aqueous phase containing water-soluble ingredients, (salt, citric acid, potassium sorbate, gelatin, milk protein).

This mixture was texturized by working and cooling it in a sequence of surface scraped heat exchangers, crystallizers and resting tubes, whereby a spread was obtained.

The taste of the product was sweet and fresh-creamy. When compared with a product of the same composition, except for the butter which was not heated, the product containing heated butter was clearly preferred by a majority of the panelists.

EXAMPLE 5

Sour cream butter was heated in a closed tank at 80° C. for one hour. A low calorie fat spread, in which the heat-treated butter was used, was prepared in a conventional manner by using a scraped drum cooling device (Votator ®).

The composition of the spread obtained was as follows:

| | % (w/w) | |
|---|---|---|
| Fat phase | | |
| Butterfat from heat-treated butter | 27.0 | |
| Emulsifier (Hymono 4404 ®) | 0.3 | Total fat phase 27.3% (w/w) |
| Beta carotene (30% solution) | 0.0009 | |
| Aqueous phase | | |
| Gelatin (Geltec ®) | 2.37 | |
| Buttermilk powder | 1.1 | |
| NaCl | 1.65 | Total aqueous phase 72.7% (w/w) |
| Potassium sorbate | 0.13 | |
| Starch (Colflo 67 ®) | 2.21 | |
| Skim milk | 5.8 | |
| Water* | 59.44 | |

Total fat + aqueous phase 100.0
*partially originating from the heat-treated butter The pH of the aqueous phase was adjusteed to 5.65 by means of a 20% solution of citric acid.

The low fat spread obtained was compared with a low fat spread of the same composition but with non-heat-treated butterfat. The low fat spread comprising the heat-treated butter was preferred as it had a more pronounced creamy and sweet flavour note.

EXAMPLE 6

Experiments were carried out to determine the influence of the butterfat to water ratio in the dairy emulsion, which is subjected to the heat treatment, on the flavour obtained after such treatment. The experimental results obtained indicate that the best flavour results are obtained if the butterfat to water ratio is at least 2:3. The dairy emulsion comprising butterfat and water in a 2:3 ratio, after a heat treatment of 1 hour at 80° C., had a taste which was slightly reminiscent of cooked milk, which latter taste is considered to be less desirable.

EXAMPLE 7

6 yellow fat spreads were made with 20% heated butter and 80% flavoured margarine. The butter was heated according to the procedure of Example I under the following heating conditions:
 (i) 1 hour heating at 80° C.
 (ii) 30 minutes heating at 80° C.
 (iii) 10 minutes heating at 80° C.
 (iv) 1 hour heating at 100° C.
 (v) 30 minutes heating at 100° C.
 (vi) 10 minutes heating at 100° C.

These 6 products were evaluated by 8 experts and ranked in the order of "most butter-like taste". The best product scored 1 point; the worst scored 6 points. This ranking resulted in the following order: Product 1: 15 points, product 2: 31 points, product 3: 38 points, product 4: 35 points, product 5: 20 points and product 6: 29 points.

From these figures it can be concluded that a heating time of 30 minutes or more is preferred and that preferably longer heating times should be combined with lower heating temperatures.

I claim:
1. Spread having a dairy fat content between 9 and 65% (w/w), wherein the spread comprises (a) a dairy cream which has been heated to a temperature of from 70° C. up to 105° C. for from 20 minutes up to 3 hours and which includes whey proteins and at least 30% (w/w) of dairy fat, with at least 50% (w/w) of the whey proteins being present in said cream in a denatured form, and (b) 25–90% (w/w) of water and/or non-dairy fat.

2. Spread according to claim 1, comprising:
 9–50% (w/w) dairy fat,
 0–41% (w/w) non-dairy fat and
 50–86% (w/w) water.

3. Spread according to claim 1, comprising:
 9–50% (w/w) dairy fat,
 20–86% (w/w) non-dairy fat and
 5–50% (w/w) water.

4. Spread according to claim 1, having an overall water plus non-dairy fat content ranging from 50–86% (w/w).

5. Process for the preparation of a spread containing dairy fat, wherein a dairy cream which includes whey proteins and at least 30% (w/w) of dairy fat is heated to a temperature from 70° C. up to 105° C. for from 20 minutes up to 3 hours, which heated dairy cream is subsequently worked with 25–90% (w/w) of water and/or non-dairy fat into a spread, so that a spread is obtained containing from 9–65% (w/w) dairy fat.

6. Process according to claim 5, wherein the dairy cream is heated to a temperature ranging from 80°–95° C.

7. Process according to claim 5, wherein the cream is heated for 45–150 minutes.

8. Process according to claim 5, wherein the cream is heated in a closed system.

9. Process according to claim 5, wherein non-heat-treated dairy emulsion is added to the heat-treated dairy cream and water and/or non-dairy fat to form a mixture before the mixture is worked into a spread.

10. Process according to claim 9, wherein the water and/or non-dairy fat and non-heat-treated dairy emulsion are added in such amounts that the mixture to be worked into the spread contains 10–86% (w/w) non-dairy fat.

11. Process according to claim 9, wherein the water and/or non-dairy fat and non-heat-treated dairy emulsion are added in such amounts that the mixture to be worked into the spread comprises:
 38–86% (ww) of non-dairy fat
 9–50% (ww) of the heat-treated dairy cream,
 5–50% (ww) of water and
 0–50% (ww) of a non-heat-treated dairy emulsion.

12. Process according to claim 11, wherein the mixture comprises:

38–72% (ww) of non-dairy fat

12–50% (ww) of the non-heat-treated dairy cream,

6–40% (ww) of water and

10–44% (ww) of a non-heat-treated dairy emulsion.

13. Spread obtained by a process according to claim 6.

14. A spread comprising:

38–86% (ww) of non-dairy fat

9–50% (ww) of a dairy emulsion, with more than 30% fat, which has been heated to a temperature of 70°–105° C. for from 20 minutes up to 3 hours 5–50% (ww) of an aqueous phase and 0–50% (ww) of dairy emulsion which has not been subjected to the above heat treatment.

15. Spread having a dairy fat content between 9 and 65% (w/w), wherein the spread comprises (a) a dairy cream which has been heated to a temperature of from 70° C. up to 105° for from 20 minutes up to 3 hours and which includes whey proteins and at least 30% (w/w) of dairy fat, with at least 70% (w/w) of the whey proteins being present in said cream in a denatured form and (b) 25–90% (w/w) of water and/or non-dairy fat.

* * * * *